United States Patent [19]
Bender et al.

[11] Patent Number: 6,021,979
[45] Date of Patent: Feb. 8, 2000

[54] SUN-REFERENCED SAFE-HOLD CONTROL FOR MOMENTUM BIASED SATELLITES

[75] Inventors: Douglas J. Bender, Redondo Beach; William A. Nakano, San Pedro; William L. Burkett, Redondo Beach; Kenneth R. Obert, Torrance; Tiffany Bowles, Redondo Beach; Stuart F. Bockman, Torrance, all of Calif.

[73] Assignee: Hughes Electronics Corporation, El Segundo, Calif.

[21] Appl. No.: 08/094,631

[22] Filed: Jul. 19, 1993

[51] Int. Cl.[7] ...................................................... B64G 1/24
[52] U.S. Cl. ............................ 244/164; 244/165; 701/13
[58] Field of Search ................................. 244/164, 165, 244/166, 168, 169, 170; 701/13

[56] References Cited

U.S. PATENT DOCUMENTS

| | | | |
|---|---|---|---|
| 4,949,922 | 8/1990 | Rosen ........................................ | 244/164 |
| 5,269,483 | 12/1993 | Flament .................................... | 244/164 |
| 5,312,073 | 5/1994 | Flament et al. .......................... | 244/168 |

*Primary Examiner*—Galen L. Barefoot
*Attorney, Agent, or Firm*—Georgann S. Grunebach; M. W. Sales

[57] ABSTRACT

A sun-referenced safe-hold control system for momentum-biased satellites employs a safe-hold processor responsive to a set of sun sensors to detect attitude errors of the solar wings. Safe-hold processor provides independent control logic which rotates the solar wings to ensure that sunlight is maintained incident on the solar wings to maintain solar power in the safe-hold mode. In addition, the safe-hold processor provides independent control of the momentum wheel to place the spacecraft body in a passively stable nutational state. Passive nutational stability inherent in a momentum-biased satellite about two axes of the spacecraft enables the safe-hold processor to actively control the spacecraft about only one of its axes. The spacecraft safe-hold control system increases the period in which spacecraft health is guaranteed by adding active, closed-loop control of the solar wings.

18 Claims, 9 Drawing Sheets

6,021,979

SUN-REFERENCED SAFE-HOLD CONTROL FOR MOMENTUM BIASED SATELLITES

FIELD OF THE INVENTION

The present invention relates to a sun-referenced safe-hold control system for use on momentum-biased satellites. More particularly, the invention relates to a spacecraft safe-hold method and related control system, including a safe-hold system processor, which upon detection of a large spacecraft attitude error or rotation rate disables the normal attitude control processor and uses safe-hold processor control to steer the spacecraft about its pitch axis into an attitude in which sunlight is maintained incident on the solar wings. The invention takes advantage of a spacecraft's inherent momentum bias to maintain passive nutational stability about the roll and yaw axes.

BACKGROUND ART

The attitude control system architecture of large low-earth orbit satellites typically includes an independent back-up safe-hold mode. Such low-earth orbit satellite systems are typically not momentum-biased and therefore must be actively controlled about all three axes. These satellites employ gyros to measure spacecraft attitude and thrusters and/or reaction wheels for attitude control in their safe-hold mode. Upon detection of an attitude error, typically the low-earth orbit satellite is controlled to steer its solar wings toward the sun.

Some geosynchronous orbit momentum biased satellites have a back-up mode which controls a momentum wheel to a fixed rate upon detection of an attitude error with the result that the entire spacecraft, including the solar wings, rotates. However, the spacecraft's health can be guaranteed in this mode for only a few hours because full solar power is not available. On some spacecraft, where the solar wings are automatically rotated ("clocked") at the orbit rate during normal operation, the solar wings may continue to rotate at the fixed rate after detection of a spacecraft failure. However, even if the momentum wheel is controlled to a fixed rate, without closed-loop control of the spacecraft or solar wings using an inertial or optical sensor, the solar wings will drift away from a sun pointing attitude within a few minutes. To ensure long-term stability, the spacecraft must be nutationally stable in the safe-hold mode. That is, the spacecraft must be configured so that nutation does not tend to grow. Although some spacecraft, including geosynchronous orbit momentum biased satellites, have used sun sensors on the solar wings as part of a closed-loop control system to point the wings to the sun, sun sensors mounted on solar wings have not been used as part of a fault-protection system.

Thus a method is required to place a momentum-biased spacecraft in a nutationally stable momentum state and increase the period over which spacecraft health can be guaranteed. Also a method is required to control the spacecraft attitude to direct the solar wings toward the sun.

SUMMARY OF THE INVENTION

The present invention provides a momentum-biased satellite attitude control system in which the satellite is actively controlled about only one axis (passively in the other two) using sun sensors on solar wings to detect solar wing pointing or attitude errors. The present invention increases the period in which spacecraft health is maintained by taking advantage of the passive stability in the roll and yaw axes provided by the momentum bias of the momentum wheel and by adding active, closed-loop control of the solar wings to maximize solar power.

Thus, according to one aspect of the present invention, a method is provided for stabilizing a spacecraft after detection of an attitude error including the steps of: detecting large spacecraft attitude errors or rotation rates; disabling the normal attitude control processor; and establishing safe-hold processor control to steer the spacecraft about its pitch axis into an attitude in which sunlight is maintained incident on the solar wings and nutational stability is maintained.

According to another aspect of the present invention, a method is provided in which safe-hold processor control selects a redundant momentum wheel and at least one solar wing drive, and then commands the momentum wheel to full speed and the solar wing drive to rotate the solar wing into incident sunlight.

According to another aspect of the present invention, a control system is provided for achieving a nutational stability and a spacecraft attitude which tracks the sun upon detection of normal attitude control system failure. This system includes a control processor for responding to an attitude control system failure, a gyro for detecting large spacecraft rotation rates and providing a signal indicating an attitude control system failure, solar wing drives for rotating the solar wings relative to the body of the spacecraft, sun sensors for detecting spacecraft attitude errors and providing a pointing signal for controlling the solar wing drives, and momentum wheels for providing angular momentum to place the spacecraft in a passively stable nutational state.

According to another aspect of the present invention, a control system is provided in which the solar wing drives have stepper-driven motors controlled by a circuit including a control means for providing a rate control signal when the attitude error exceeds a predetermined value, and a reset-table integration means to integrate the rate control signal and derive individual stepping commands for the stepper driven motor.

Other features and advantages will become clear or will be made apparent during the course of the following description of the preferred embodiment of the present invention.

DETAILED DESCRIPTION OF THE PREFERRED EMBODIMENTS

Figure 1:
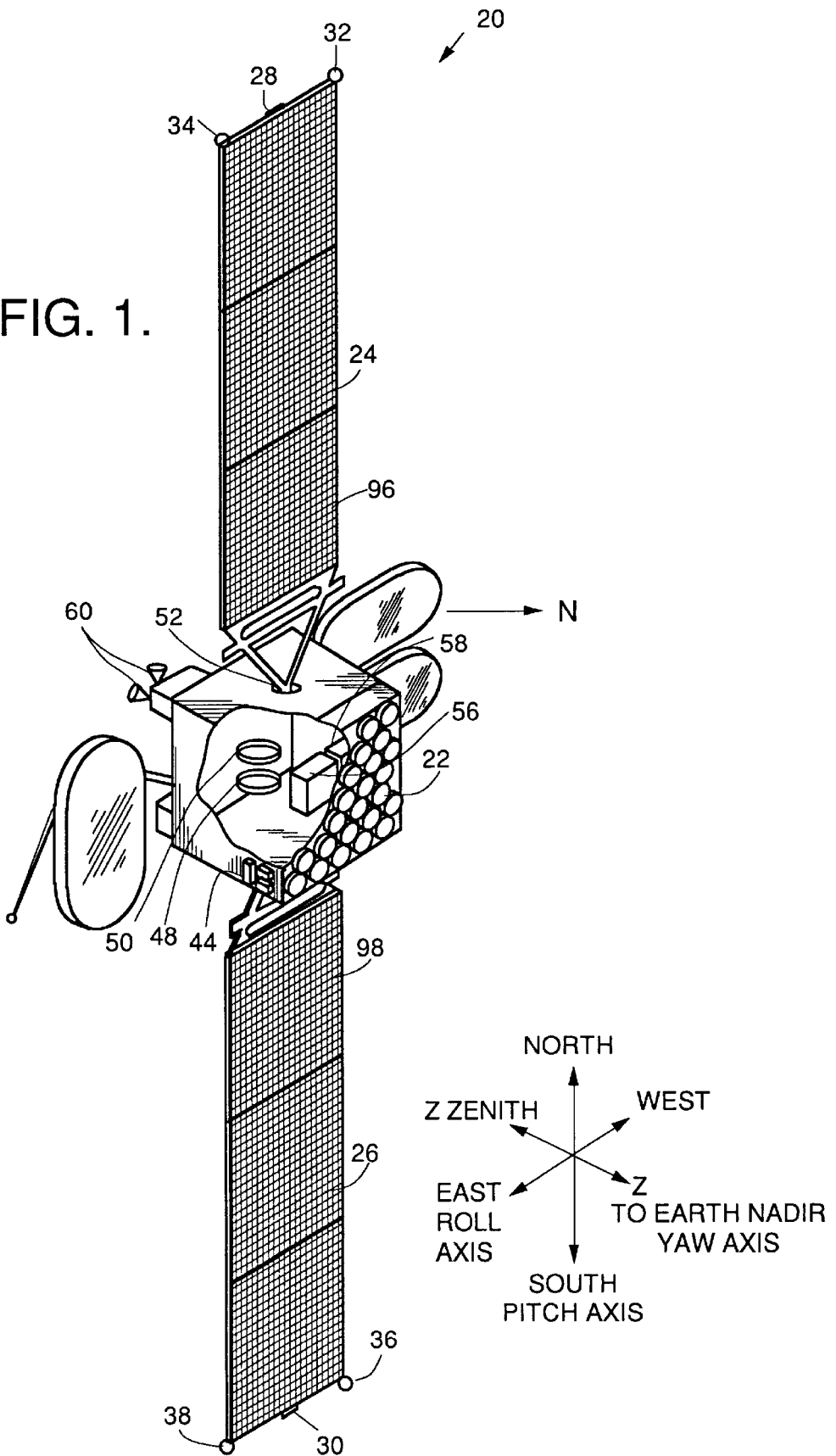
FIG. 1 is a perspective view, partially cut away, of a typical momentum-bias spacecraft with solar wings.

Referring now to the drawings wherein like reference numerals are used to reference identical components in various views, FIG. 1 depicts a typical momentum-bias spacecraft 20 with spacecraft body 22 and north and south solar wings 24, 26, respectively. The spacecraft body 22 is aligned with its forward face toward the earth and its back face toward the zenith thereby defining a yaw axis. North and south solar wings 24, 26 extend from the spacecraft body 22 thereby defining a pitch axis which is perpendicular to the east-west roll axis.

When the solar wings 24, 26 are facing the sun, a direction nominal to the sun, defined as vector N, is normal to the extended plane of each solar wing 24, 26. North and south back sensors 28, 30 are positioned on the dark side of north and south solar wings 24, 26, respectively. First and second front sensors 32, 34 are mounted on the light side of north solar wing 24. In a similar manner, first and second front sensors 36, 38, respectively, are mounted on the light side of south solar wing 26. The momentum-bias spacecraft 20 uses an attitude control processor 40 (FIG. 2) during normal on-orbit operation as the main computer which performs spacecraft attitude control system 42 (FIG. 2) functions. An earth sensor 44 is provided for sensing the attitude of the spacecraft 20 with respect to the earth relative to the roll and pitch axes. Multiple, preferably two, momentum wheels 48, 50 are provided, one of which in normal operation will spin at a high rate to provide the spacecraft's 20 bias momentum and control torque. The momentum wheels 48, 50 are preferably oriented with their spin axes, and therefore their momentum vectors, parallel to the spacecraft pitch axis. North and south solar wing drives 52, 54 drive the north and south solar wings 24, 26 about their respective axis of rotation. Gyros 56, 58 are used for sensing large spacecraft rotation rates. Thrusters 60 are controlled by the attitude control processor 40 and used for controlling the spacecraft's orbit and momentum. Gyros 56, 58 are normally on whenever thrusters 60 are fired, and are used for closed-loop control of the attitude of spacecraft body 22 during those times. Information from gyros 56, 58, typically part of the normal spacecraft attitude control system 42, is part of the spacecraft dynamic information. Sun sensors 32, 34 and 36, 38 are used for detecting large spacecraft attitude or pointing errors and for providing a pointing signal to control the angle of each solar wing 24, 26 with respect to its sun-normal vector N.

Solar wing drives 52, 54 (the south solar wing drive 54 is not shown) are typically driven by attitude control processor 40 as part of the normal spacecraft attitude control system 42. When the safe-hold processor 64 (FIG. 2) assumes control, it signals the solar wing drives 52, 54 to cause the solar wings 24, 26 to track the sun. The solar wing drives 52, 54 preferably have redundant drive motors. When the safe-hold processor 64 assumes control of the spacecraft 20, it selects the redundant motor of each solar wing drive 52, 54, i.e., the drive motor not used by the attitude control processor 40 prior to safe-hold processor 64 initiation. In an alternate implementation, the safe-hold processor 64 does not control the solar wing drives 52, 54 but instead controls the momentum wheels 48, 50, steering the entire spacecraft 20 to track the sun.

In the preferred design, the momentum wheels 48, 50 have internal overspeed protection circuitry which limits the momentum wheels' 48, 50 speed to a fixed value if full torque is commanded. During safe-hold operation in this preferred implementation, the safe-hold processor 64 commands full torque to one of the momentum wheels 48, 50 to increase the spin rate, which may be necessary in order to ensure that the spacecraft 20 is nutationally stable.

In a first alternative embodiment, the safe-hold processor 64 actively controls the momentum wheel 48, 50 to a fixed commanded rate, for example, the rate that the momentum wheel 48, 50 had before the failure of the normal attitude control system 42. If a wheel is driven by a voltage input, it can be controlled to a desired fixed speed with no digital interface or tachometer processing by connecting a fixed voltage to the wheel's input which balances the wheel's inherent back EMF (ElectroMotive Force) at the desired wheel speed. In a second alternative embodiment, the safe-hold processor 64 does not control the momentum wheels 48, 50 at all but allows the momentum wheel 48, 50 to spin down and the resulting momentum to be transferred to the spacecraft body 22. This configuration may be nutationally unstable for some spacecraft. In each of these three embodiments, the safe-hold processor 64 also controls the solar wing drives 52, 54 to track the sun. In a final third alternative embodiment, the solar wings 24, 26 are fixed with respect to the spacecraft body (22) control and the safe-hold processor 64 controls the momentum wheel 48, 50 to steer the entire spacecraft body 22 to track the sun. As stated above, there are typically two redundant momentum wheels 48, 50. When the safe-hold processor 64 puts itself in control it selects the redundant momentum wheel 48, 50, i.e. the momentum wheel 48, 50 not used by the attitude control processor 40 immediately prior to safe-hold processor 64 initiation.

Figure 2A:
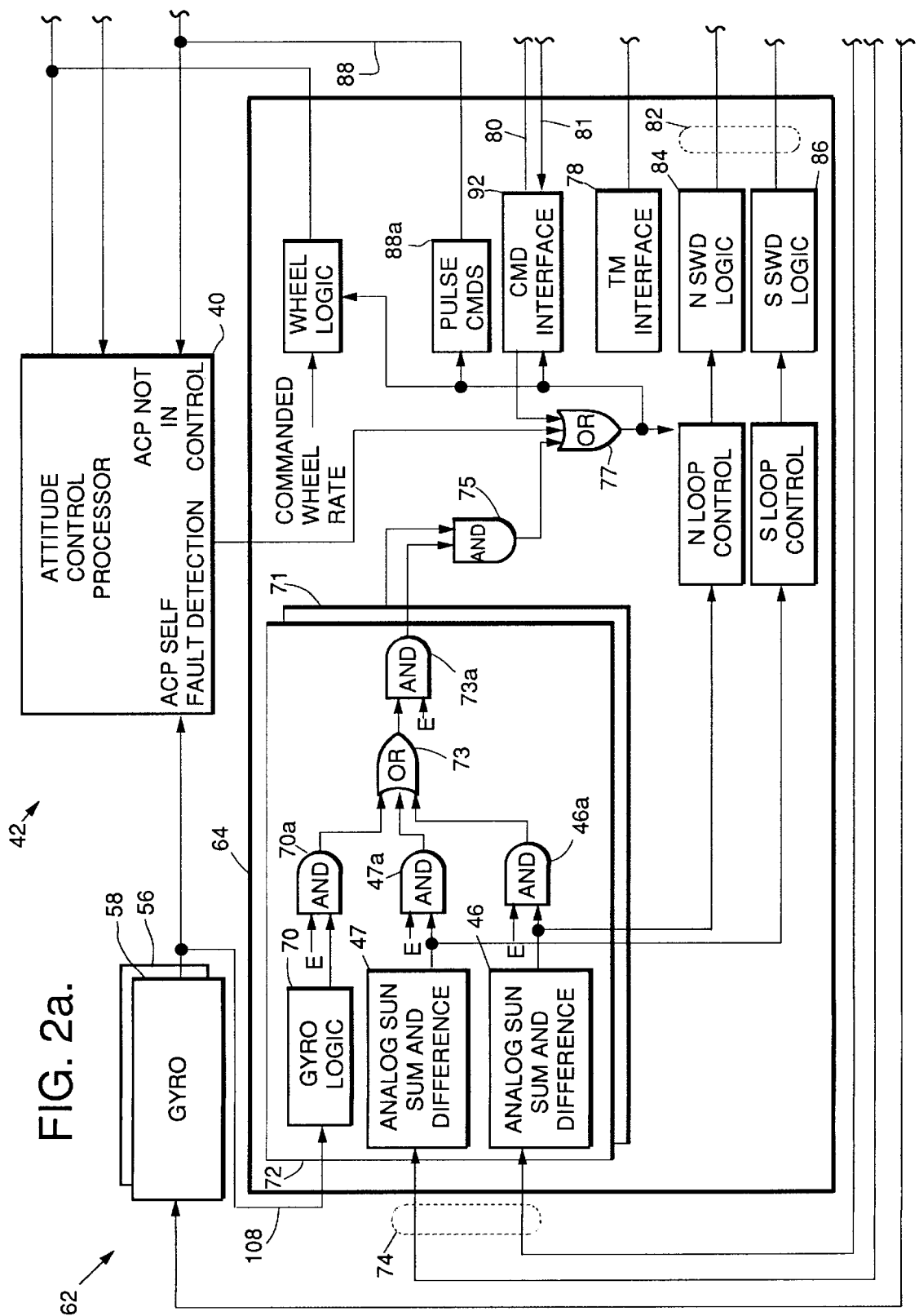
FIGS. 2A and 2B are a schematic depicting the spacecraft safe-hold control system architecture including the safe-hold processor.
Figure 2B:
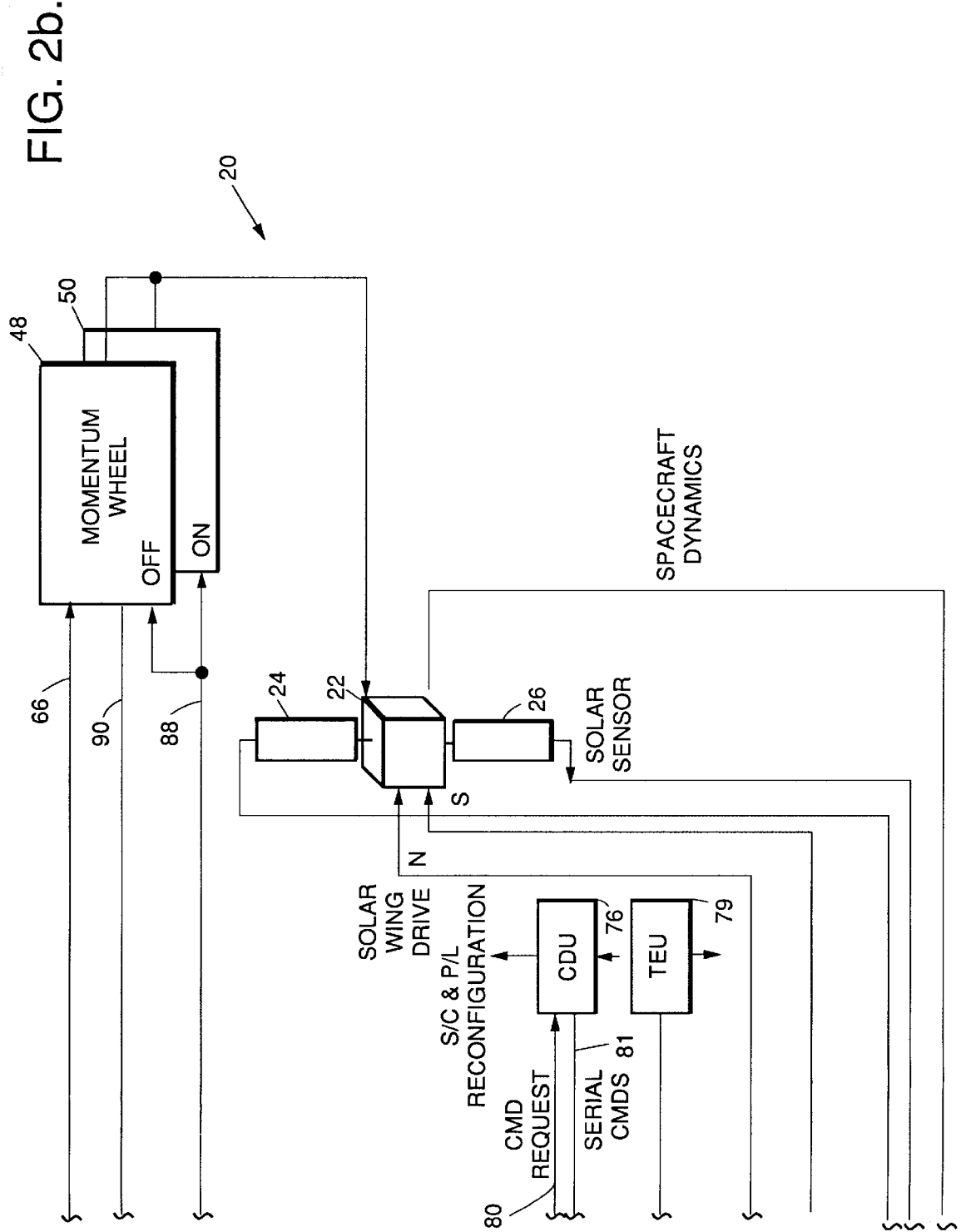

FIGS. 2A and 2B, taken together, are a schematic depicting the spacecraft safe-hold control system architecture, generally denoted by 62, including safe-hold processor 64. Spacecraft 20 is depicted with solar wings 24, 26 and first and second momentum wheels 48, 50. During normal operation, attitude control processor 40 outputs envelope, clock and data signals to control first and second momentum wheels 48, 50 via data bus 66. The momentum from the momentum wheels 48, 50 is imparted to the spacecraft body 22. During some mission phases, resulting spacecraft dynamics are sensed by gyros 56, 58 which transmit spacecraft rate control signals to attitude control processor 40 and gyro logic interface 70, part of the detection logic 72 contained in safe-hold processor 64.

Safe-hold processor 64 receives analog sun sum and difference signals from sun sensors 32, 34 and 36, 38 via sensor input lines 74 and interfaces with the command decoder unit 76 to receive serial commands over serial command link 81 or to request serial commands to be sent from the Safe-hold processor over the command request link 80 to reconfigure the spacecraft. The command decoder unit 76 has an uplink connection to an earth ground-station. Safe-hold processor 64 also provides data gathered at the telemetry interface unit 78 to the telemetry encoder unit 79 via a data link. The telemetry encoder unit provides information to a transmitter (not shown) which communicates the information, preferably to an earth ground-station where it is decoded. Safe-hold processor 64 outputs control signals via solar wing drive output lines 82 from north and south solar wing drive logic interfaces 84, 86, respectively, to north and south solar wing drives 52, 54, respectively. Safe-hold processor 64 outputs pulse command signals via pulse command output line 88 to enable or disable the momentum wheels 48, 50 and the attitude control processor 40. First and second momentum wheels 48, 50 output tachometer data signals to the attitude control processor 40 via tachometer input line 90. Safe-hold processor 64 includes a redundant trigger or detection logic circuit 71. Detection logic "and" gate 75 provides that if both the detection logic circuit 72 and the redundant detection logic circuit 71 trigger, the safe-hold processor 64 will assume control of spacecraft attitude. An alternative implementation can be provided using an "or" gate in which the safe-hold processor 64 assumes control if either detection logic circuit 72 or redundant detection logic circuit 71 is triggered. Detection logic 72 and redundant detection logic 71 each include a sensor logic "or" gate 73 which accepts inputs gyro logic 70 and analog sun sum and difference logic signals 46 and 47, north and south respectively. Thus, sensor logic "or" gate 73 triggers in the event that either the gyros 56, 58 detect a large rotational rate of the spacecraft body 22 or the analog sun sum and difference logic circuits 46, 47 detect an attitude error from either solar wing 24, 26 in a manner described below with reference to FIGS. 6A–6C. If any of these three events occurs and all gates are enabled, the detection logic 72 triggers. The gyro logic 70 and analog sun sum and difference signals 46, 47 can be enabled or disabled using the enable lines, E, on the respective output enable "and" gates 70a, 46a, 47a. In addition, the output of sensor logic "or" gate 73 can be disabled by output enable "and" gate 73a. Finally, even though "and" logic gates 70a, 46a or 47a have triggered, detection logic 72 can be enabled or disabled using the enable line, E, of detection logic "or" gate 73a. These gates are controlled through the command interface 92 or can be controlled by the ACP 40.

Safe-hold mode "or" gate 77 provides that in the alternative, a ground command for safe-hold processor 64 to assume control can be sent to the safe-hold processor 64 through the command decoder unit 76 and command interface 92. The attitude control processor 40 can also command the safe-hold processor 64 to assume control through safe-hold mode "or" gate 77 in the event that its own fault protection logic determines that safe-hold mode is appropriate. In the event that a command is issued from either the command interface 92 or the attitude control processor 40 or the "and" gate 75 is triggered, the "or" gate 77 triggers the solar wings to enter a track mode controlled by the analog sun sum and difference logic circuits 46, 47. The "or" gate 77 also outputs a command to the command interface 92, which reconfigures the spacecraft and payload for power conservation through the command decoder unit 76, and commands a wheel logic unit 66a to spin down the momentum wheels 48, 50 via the data bus 66. The "or" gate 77 also disables the attitude control processor 40 through a pulse command circuit 88a using the command line 88. All as explained in greater detail below.

The safe-hold processor 64 is an electronic unit containing logic to detect large spacecraft rates using information from the gyros 56, 58 or solar wing pointing errors sensed by the sun sensors 32, 34 and 36, 38. Information from gyros 56, 58 is transmitted via gyro input line 108 to the gyro logic interface 70 in the safe-hold processor 64 from the inertial reference unit 68 which detects large spacecraft rotation rates. When large spacecraft rotation rates are detected, safe-hold processor 64 puts itself in control, disables the attitude control processor 40, then outputs control signals to either the solar wing drives 52, 54 or to the momentum wheel 48, 50 to steer the spacecraft body 22 about its pitch axis and to position solar wings 24, 26 so that sunlight falls incident on them.

The safe-hold processor 64 may contain analog or digital components and may or may not contain a microprocessor. The preferred implementation is simple and highly reliable having only hard-wired analog or digital electronics and no microprocessor. Safe-hold processor 64 may be combined with other electronic units or may be part of the main onboard control computer, the attitude control processor 40. An independent or stand-alone, safe-hold processor 64 is the preferred implementation.

One nonredundant safe-hold processor 64, if simple and fault proof, is considered sufficient, however, two redundant safe-hold processors, or even three in a voting configuration, may be provided. The preferred implementation of the present invention utilizes a single safe-hold processor 64 which is internally redundant, for example, employing dual detection logic circuits 72. In this preferred implementation, the safe-hold processor 64 and any of its internal detection logic 72 can be enabled or disabled by ground command via the command interface 92.

Figure 3:
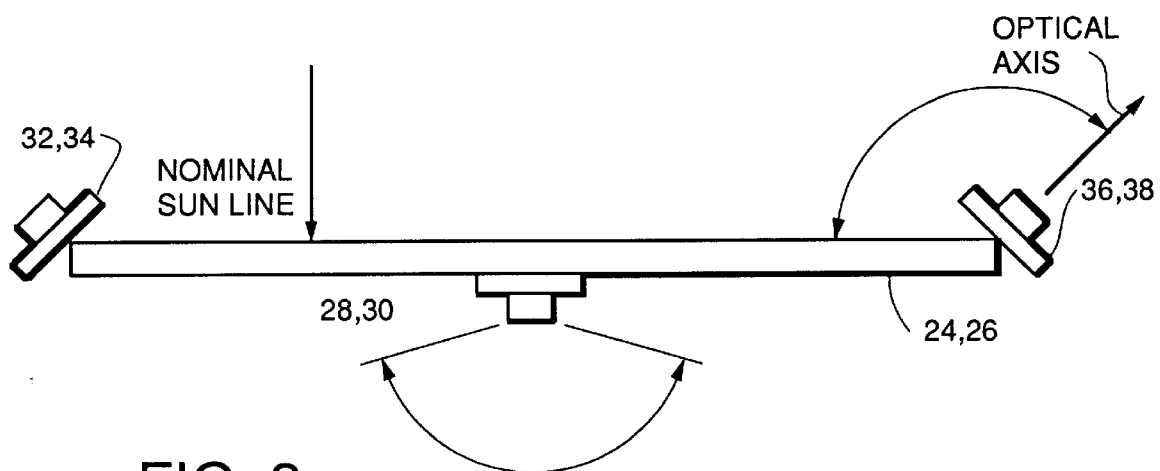
FIG. 3 is an end view of both the north and the south solar wing depicting the orientation of the sun sensors.

FIG. 3 depicts the orientation of the sun sensors 28, 30, 32, 34, and 36, 38 on the solar wings 24, 26 as seen from the north end of the northern solar panel and the south end of the southern solar panel. The N vector represents the nominal sun direction defining the light side of north and south solar panels 96, 98, respectively. Back sensors 28, 30, are mounted on the dark side of north and south solar wings 24, 26, respectively, and preferably have a 150 degree useful field of vision. First and second front sensors 32, 34 and 36, 38, north and south respectively, are mounted on lateral sides of the solar wings 24, 26 at typically a 135 degree angle, measured from the plane of the solar wing 24, 26 to the optical axis of the sensor 32, 34 and 36, 38.

Figure 4:
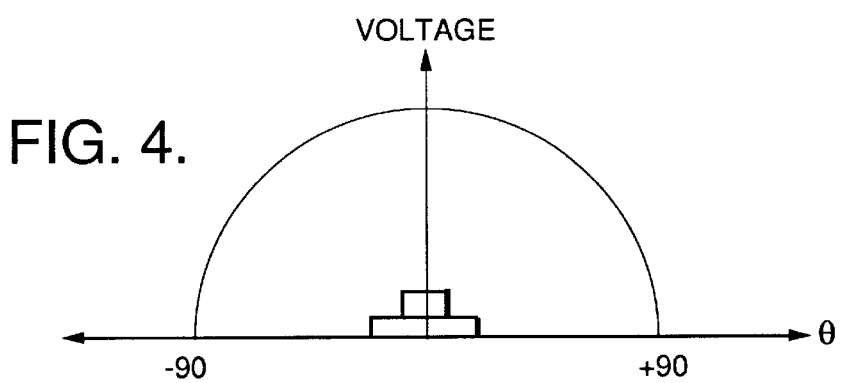
FIG. 4 is a graph depicting the output voltage of a sun sensor as a function of the angle between the sun and the sensor normal.

In the preferred configuration, sun sensors 32, 34 and 36, 38, as shown in FIG. 4, are simple cosine-law devices which create a voltage proportional to the cosine of the angle r between the sun-normal vector N and the sun according to the equation:

$$V = K \cos \theta$$

where:

V is the output voltage in volts,

K is a constant of proportionality, and

θ is the sun azimuth angle with respect to the sensor normal in degrees.

Figure 5:
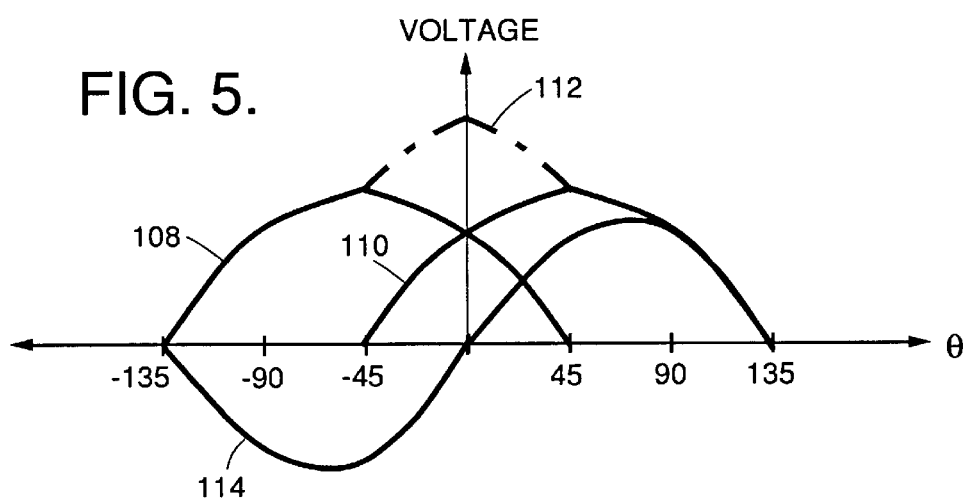
FIG. 5 is a graph depicting the combined output voltages of the first and second front sun sensors as a function of the sun's azimuth angle in degrees.

Three sun sensors 28, 30, 32, 34 and 36, 38 are located on each solar wing, north and south 24, 26 respectively, oriented as shown in FIG. 3. Back sensors 28, 30 are located on the "back" or dark side of the wing, pointing in the direction opposite the usual direction of the sun. First and second front sensors 32, 34 and 36, 38 are on the "front" or light side of north and south solar wings 24, 26, respectively. The field of view of front sensors 32, 34 and 36, 38 is offset about the solar wing rotation axis so as to lead and lag the sun as the solar wing 24, 26 rotates to track the sun. Back sensors 28, 30 and first and second front sensors 32, 34 and 36, 38, on north and south solar wings 24, 26 respectively, create the necessary signals for detecting large pointing offsets of the solar wings 24, 26 with respect to the sun about the wings' axis of rotation, and for controlling the solar wing drives 52, 54 to track the sun. The outputs of front sun sensor 32, 34 and 36, 38 are added and subtracted to create sum signal 112 and difference signal 114 as shown in FIG. 5. When the sum signal exceeds a threshold, the sun is declared to be on the front side of the solar wing 24, 26 and the difference signal can be used to determine the azimuth angle between solar wings 24, 26 and the sun.

The "back" signal is used to determine whether the spacecraft 20 is in eclipse, i.e., whether the earth or another celestial body is between the spacecraft 20 and the sun. An eclipse cuts off sunlight and renders futile any attempts to detect large pointing errors with respect to the sun or to control the attitude of the solar wings 24, 26 with respect to the sun. The combination of the three detectors or sun sensors 28, 30 and 32, 34 and 36, 38, on each solar wing 24, 26 respectively, collectively have a 360 degree field of view. The spacecraft 20 is determined to be in eclipse if all three detectors or sun sensors 32, 34 and 36, 38 and 28, 30 on either solar wing 24, 26, respectively, have outputs below a threshold value.

FIG. 6(A–C) is a logic diagram depicting the initiation logic for detecting and responding to attitude control system 42 failures. The safe-hold processor 64 monitors two sets of sensors to detect failures: gyros 56, 58 and sun sensors 28, 30, 32, 34 and 36, 38. If gyros 56, 58 are active, as indicated by the built-in-test signal coming true, the safe-hold processor 64 monitors their rotation rate measurements. If a predetermined rate threshold is exceeded in any axis, the safe-hold processor's 64 detection logic 72 triggers. The safe-hold processor 64 also monitors the sun sensors 28, 30, 32, 34 and 36, 38, looking at each solar wing 24, 26 separately. If any of the sun sensors 28, 30, 32, 34 and 36, 38 on either wing, respectively, indicates a large pointing error, the safe-hold processor's detection logic 72 triggers.

The safe-hold processor's detection logic 72 must trigger at higher threshold spacecraft rotation rates than those typical in thruster maneuvers. It is also advisable that the threshold spacecraft rotation rate be low enough so that after the safe-hold processor 64 assumes control and disables further thrusting, the momentum stored in the spacecraft body 22 along its roll and yaw axes is less than the momentum stored in the momentum wheel 48, 50 prior to the attitude control system 42 failure. If this condition is violated, the spacecraft body 22 experiences greater than 45 degrees nutation after the safe-hold processor 64 assumes control and maneuvering well enough to obtain sufficient sunlight on the solar wings 24, 26 is difficult.

Figure 6A:
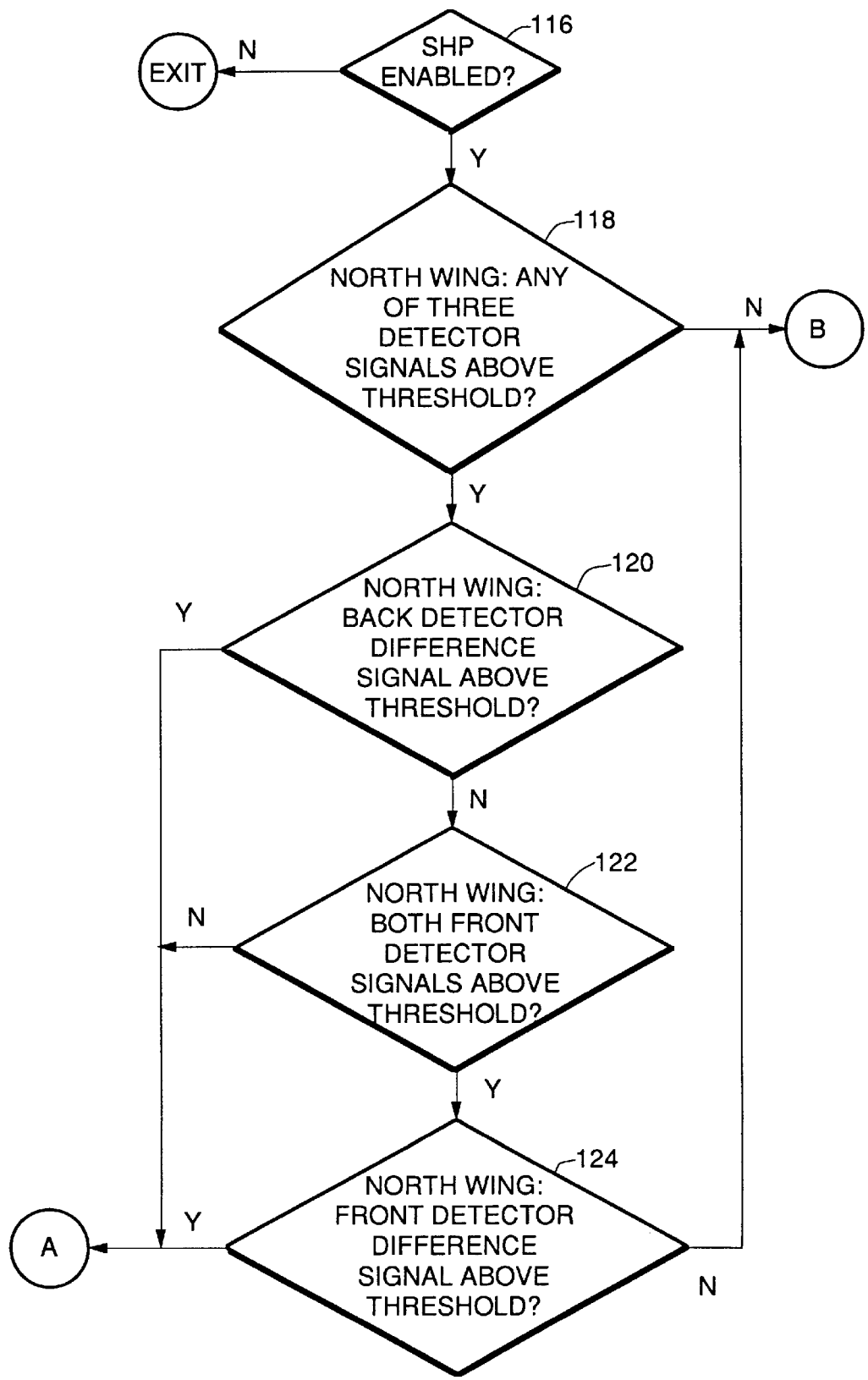
FIGS. 6A–6C are a logic diagram depicting the logic for detecting and responding to attitude control system failures.
Figure 6B:
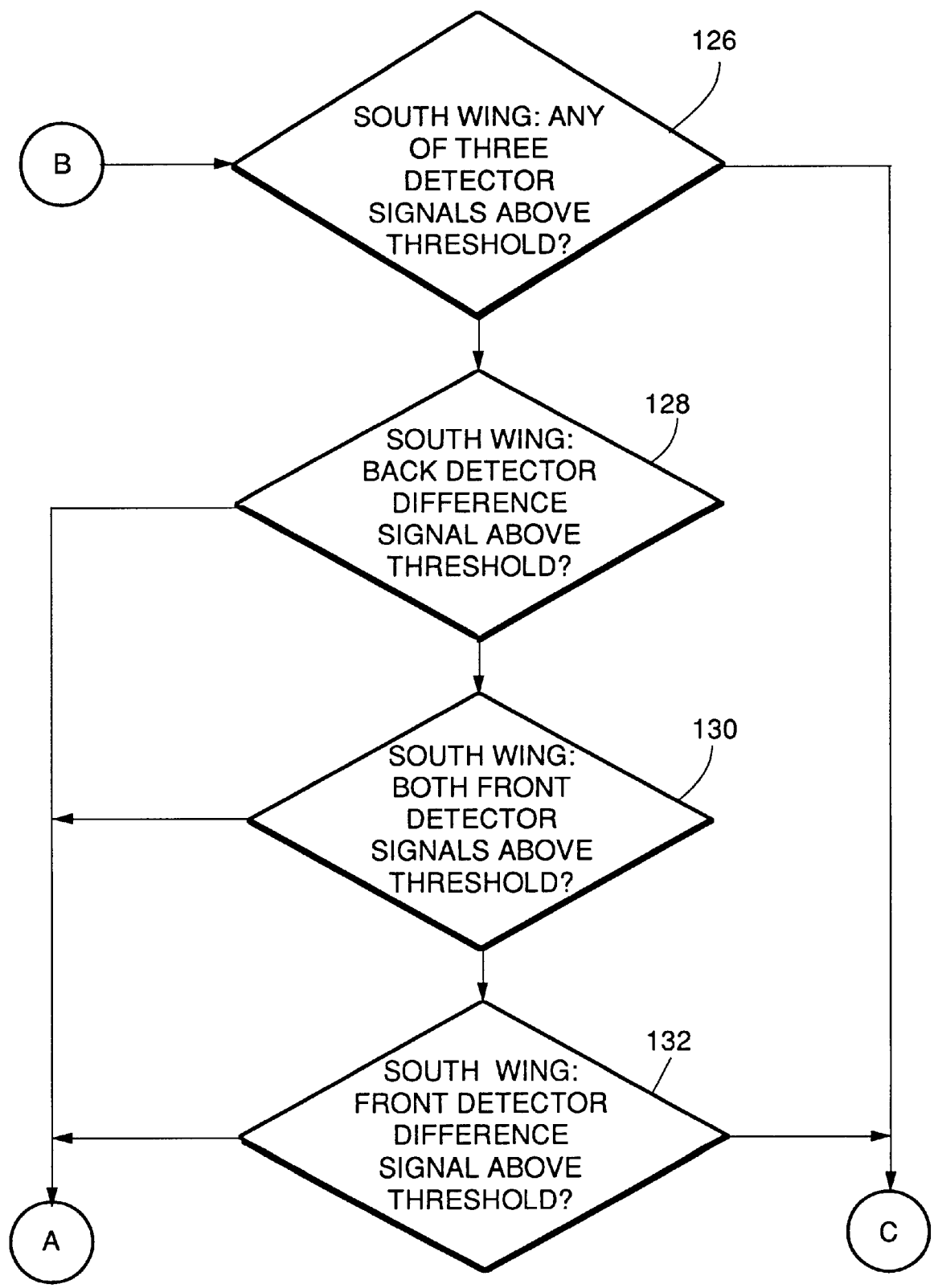
Figure 6C:
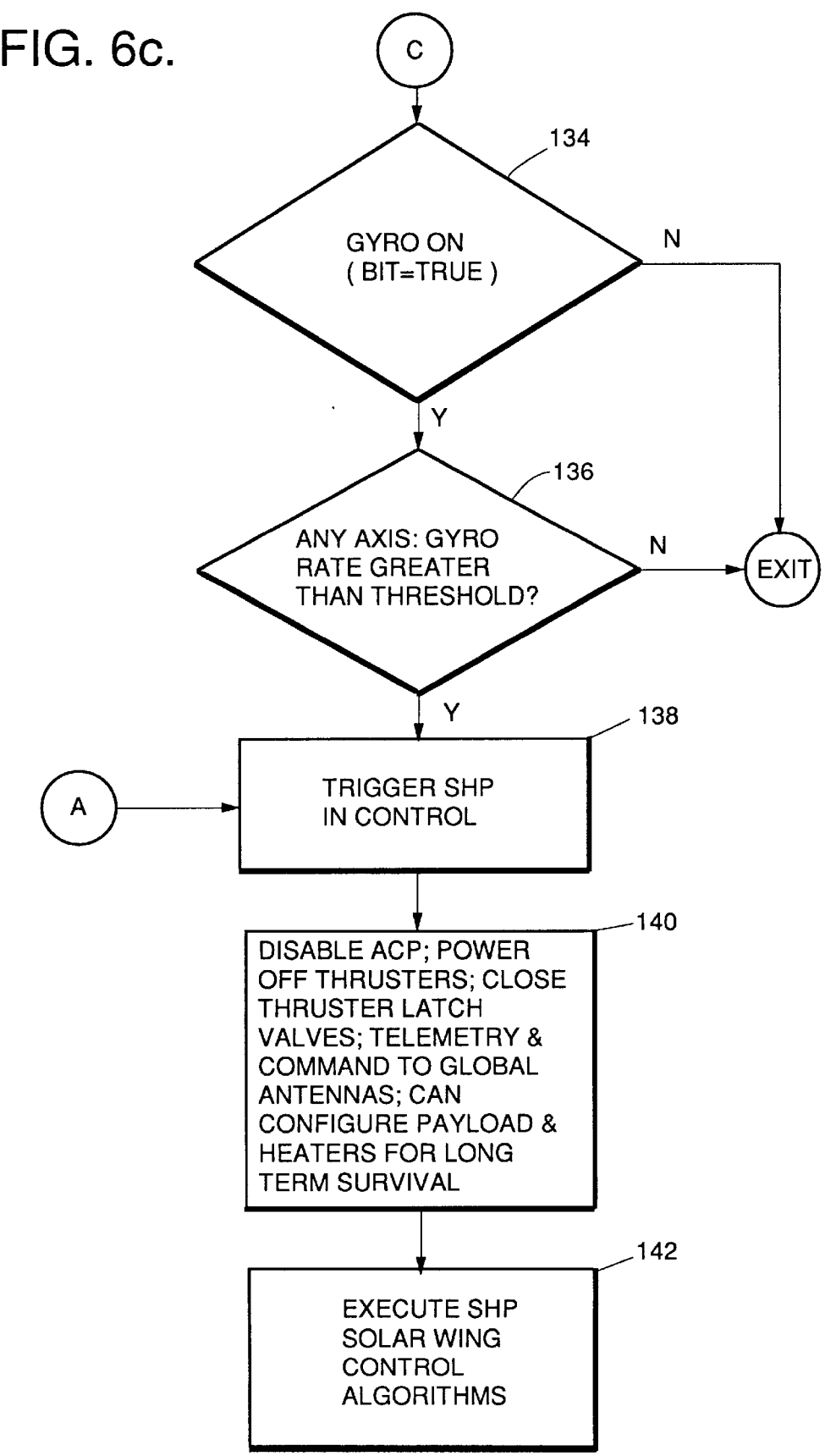

The control method for detecting and responding to attitude control system 42 failures begins in step 116 of FIG. 6A when the safe-hold processor 64 is enabled. In steps 118 and 126, the safe-hold processor 64 monitors the front and back sun sensor output signals 28, 30, 32, 34 and 36, 38 on solar wings 24, 26, respectively, to determine whether any of these signals are above the preselected threshold value indicating that the spacecraft 20 is not in eclipse. If the spacecraft 20 is determined in steps 118 and 126 to be in eclipse, safe-hold processor 64 continues in step 136 to monitor gyros 56, 58. If the gyro rotation rate in step 136 is determined to be greater than a predetermined threshold rate, 0.2 deg./sec. for example, safe-hold processor 64 assumes control in step 138.

In steps 118 and 126, if the spacecraft 20 is determined not to be in eclipse, the safe-hold processor 64 then determines whether the detection signals of back sensors 28, 30 in steps 120 and 128, respectively, exceed a preselected value of the sensor 28, 30 output voltage. If the detection signal of either back sensor 28, 30 is found in steps 120 and 128 to be above the preselected threshold value indicating that the back of the solar wing 24, 26 is facing the sun, the safe-hold processor 64 again assumes control in step 138.

In steps 120 and 128, if the back of the solar wing 24, 26 is determined not to be facing the sun, safe-hold processor 64 monitors the detection signals 108 and 110 of both front sensors 32, 34 and 36, 38 in steps 122 and 130, respectively, to determine whether they exceed a predetermined threshold value of the sensor. If only one of the detection signals 108 and 110 of front sensors 32, 34 and 36, 38, respectively, is above the preselected threshold value, the solar wing 24, 26 is assumed to be offset, or not pointed correctly toward the sun, and safe-hold processor 64 assumes control in step 138.

If in steps 122 and 130, the solar wings 24, 26 are determined not to be offset, safe-hold processor 64 then uses the difference signal 114 from front sensors 32, 34 and 36, 38 in steps 124 and 132, respectively, to determine whether either of these difference signals 114 is above a predetermined threshold value. If of these difference signals 114 is not above the preselected threshold value, the corresponding solar wing 24, 26 is assumed to be facing the sun. In step 134, the gyros 56, 58 are tested to determine whether they are operational. If the gyros 56, 58 are non-operational, the method is exited. If the gyros are determined in step 134 to be operational, safe-hold processor 64 continues in step 136 to monitor gyros 56, 58. In steps 124 and 132, if the difference signal 114 from either set of front sun sensors 32, 34 and 36, 38 is above the preselected threshold value, the solar wing 24, 26 is assumed to be offset or not pointed correctly toward the sun and safe-hold processor 64 assumes control in step 138.

After safe-hold processor 64 has assumed control in step 138, the normal attitude control system 42 is disabled in step 140. In addition, the thrusters 60 are powered off and the latch valves of thrusters 60 are closed. Telemetry and command units are controlled to the greatest global coverage, typically employing S-band omni-directional antennas and the payload and heaters are configured to minimize spacecraft power requirements while maintaining temperatures above survival lower limits. Finally in step 142, the safe-hold processor executes the solar wing control logic of FIG. 7.

Thus, the safe-hold processor 64 assumes control if on either solar wing 24, 26, the sun sensors 28, 30, 32, 34 and 36, 38 indicate that: (a) the spacecraft 20 is not in eclipse; and (b) the sun is either on the back of the solar wing 24, 26 or on the front but outside the preselected error range in azimuth. The safe-hold processor 64 monitors the relative azimuth angle between the solar wings 24, 26 and its detection logic 72 triggers if this angle exceeds a preselected threshold. Safe-hold processor 64 also assumes control if the gyros 56, 58 sense excessive rotational rates of the spacecraft body 22.

This combination of detection logic 72 will detect nearly any conceivable attitude control system 42 failure. For example, a failure of the momentum wheel 48, 50 or earth sensor 44 causes the spacecraft 20 to lose lock on the earth and slowly rotate about the pitch axis of the spacecraft body 22. This rotation eventually results in large offsets of the solar wings 24, 26 from the sun-normal vector N and is detected by the safe-hold processor 64. In the alternative, if either solar wing drive 52, 54 fails, the solar wing 24, 26 will fail to keep up with or track the sun and again a pointing error will be sensed and detected by the safe-hold processor 64. Finally, if a thruster 60 sticks on or off, large spacecraft rotation rates result and are measured by the gyros 56, 58, which trigger the detection logic 72 of the safe-hold processor 64.

One assumption that is being made is that the gyros 56, 58 are operating when the thrusters 60 are fired. If a gyro 56, 58 fails while a thruster 60 is firing, the safe-hold processor 64 will sooner or later detect this condition. The safe-hold processor 64 can detect whether a gyro 56, 58 has failed in such a way as to give a high output signal. If the gyro 56, 58 fails to "hard zero", the attitude control system 42 will cease to work properly and large error angles or rotational rates may result along the other axes which the sun sensors 28, 38 or the redundant operating gyro 56, 58 will again detect.

When any of the sensors cause the safe-hold processor's 64 detection logic 72 to trigger, the safe-hold processor 64 assumes control. Although the detection logic 72 can vary, the preferred design has two independent detection circuits 71, 72 both of which must trigger for the safe-hold processor 64 to assume control. An alternative implementation is to have independent detection circuits 71, 72 and if either detects a failure, the safe-hold processor 64 puts itself into control.

Thus, when safe-hold processor 64 assumes control, it performs several basic functions for spacecraft safety: (a) it disables further action by the attitude control system 42; (b) it closes latch valves and powers off valve drivers on thrusters 60; (c) it commands the telemetry and command units to the most global possible coverage, preferably using S-band omni-directional antennas; (d) it configures the payload and heaters to minimize power requirements of spacecraft 20 while maintaining temperatures above survival lower limits; (e) it selects the redundant momentum wheel 48, 50 and commands it to full speed; and (f) it commences steering the solar wing drives 52, 54 to track the sun. The momentum wheel 48, 50 and solar wing drive 52, 54 to be used by safe-hold processor 64 can be selected by ground commands which set electronic switches, or "hard latches", to determine which component is used. Since part of what the safe hold processor 64 is guarding against is a failure of the momentum wheel 48, 50 or of the solar wing drives 52, 54, typically the component not currently in use by attitude control system 42 is selected for use by safe hold processor 64. When a redundant momentum wheel 48, 50 is used by the safe-hold processor 64, the momentum wheel 48, 50 previously used is not actively controlled and will typically spin down gradually.

Figure 7:
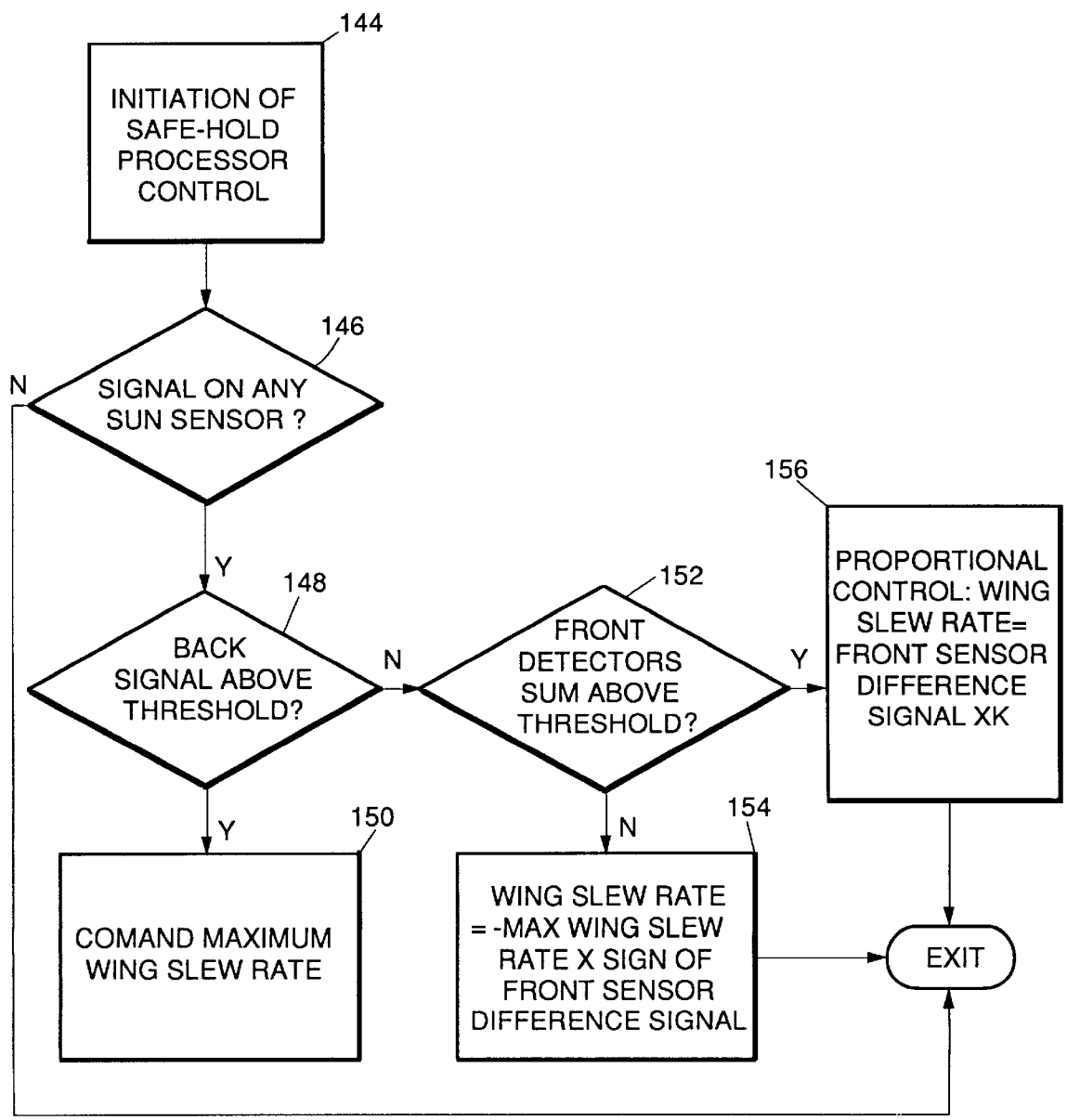
FIG. 7 is a logic diagram depicting the control logic used by the safe-hold processor to steer the solar wings to track the sun.

FIG. 7 depicts the control logic used by the safe-hold processor 64 to steer the solar wings 24, 26 to track the sun. When the safe-hold processor 64 is in control, it provides active control about the pitch or azimuth axis of spacecraft 20. The rotation of the spacecraft 20 about the roll and yaw axes is not actively controlled, but as described below, care must be taken to ensure that the nutational dynamics of the spacecraft 20 are passively stable.

Each solar wing 24, 26 is controlled independently. The solar wing control logic is begun in step 144 when the safe-hold processor 64 assumes attitude control. In step 146, if none of the safe-hold sun sensors 28, 30, 32, 34 and 36, 38 detect the sun, the solar wing 24, 26 is assumed to be in eclipse and no control signals are sent to step the solar wing drives 52, 54. In step 148, if the sun is detected by the back sensors 28, 30 on the back or dark side of the solar wing 24, 26, respectively, the appropriate solar wing drive 52, 54 is stepped at maximum rate in step 150, preferably 2.5 deg/sec, to turn the front of the solar wing 24, 26 toward the sun. In step 148, if the sun is detected by either of the front sun sensors 32, 34 and 36, 38 but not by the back sensor 28, 30, safe-hold processor 64 determines in step 152 whether the first and second front sensor sum signal 112 is above a preselected threshold value. If the sum signal 112 is below the preselected threshold value, the wing slew rate is computed in step 154 as the full slew or stepping rate multiplied by the sign of the front sensor difference signal 114 which steps the solar wing 24, 26 in the direction necessary to center the sun on the solar wing 24, 26. In step 152, if the sum signal 112 is above the preselected threshold value, the wing slew rate, is computed in step 156 as front detector difference signal multiplied by a proportionality constant K, typically 0.5 (deg/s)/deg which results in proportional control of the rotation of the solar wing 24, 26.

Figure 8:
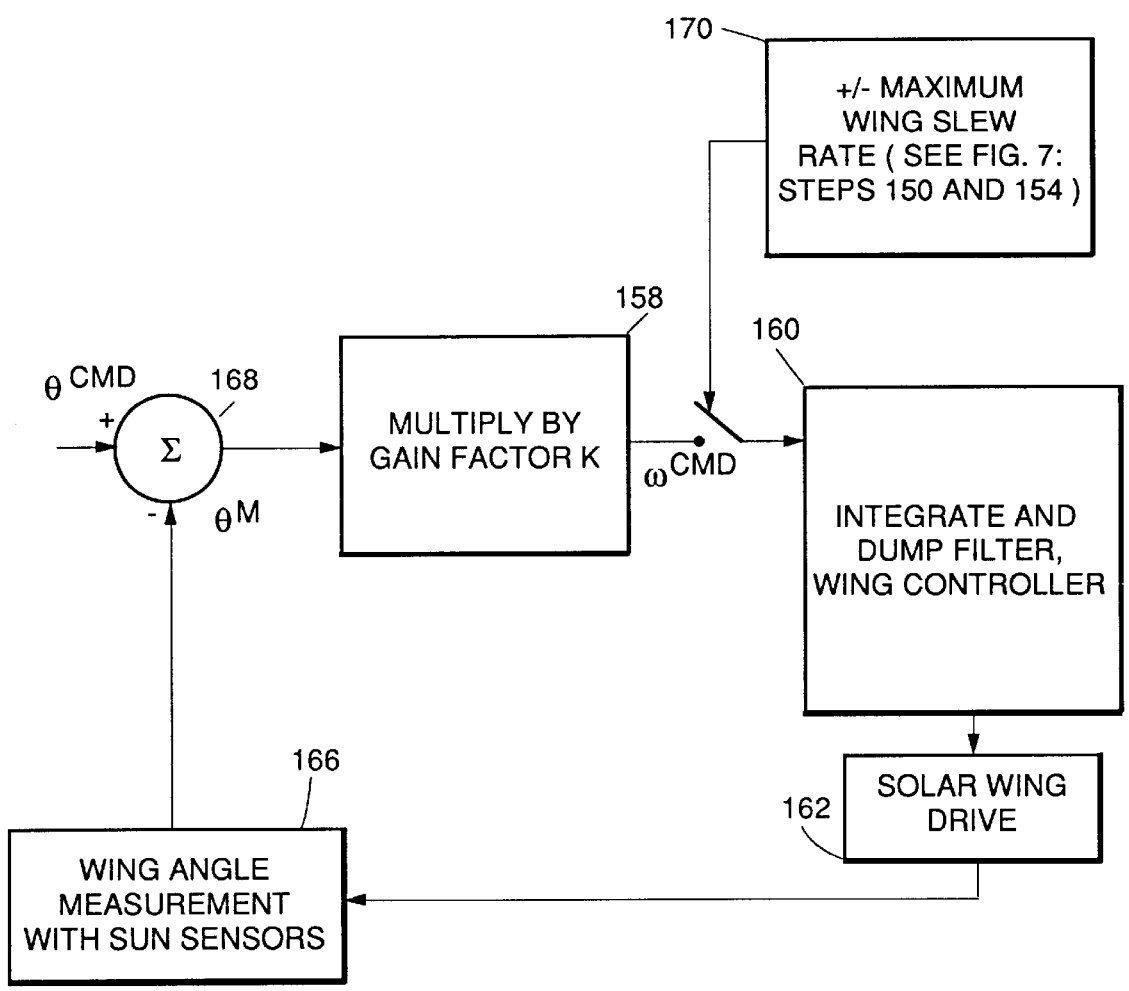
FIG. 8 is a logic diagram depicting the control logic used by the safe-hold processor to regulate the stepping rate of the solar wing drives in the case of small solar wing offset pointing angle errors.

FIG. 8 depicts the stepping rate control logic with linear feedback used by the safe-hold processor 64 to regulate the stepping rate, or wing slew rate of each of the solar wing drives 52, 54 to rotate the solar wings 24, 26, respectively. The stepping rate control logic 100 is valid when the solar wing pointing offset is small, that is, when the first and second front sensor sum signal 112 is above the preselected threshold level or the sun is in the linear range of the first and second front sensor difference signal 114. This condition is shown schematically as step 170 in FIG. 8.

In step 158, if the sun is in the linear range of the difference signal generated from front sun sensors 32, 34 and 36, 38, the solar wing 24, 26 is controlled by linear feedback, that is, the stepping rate of the solar wing drive 52, 54, $\omega^{cmd}$, is computed as gain factor K times the sensed offset pointing error, $\theta^m$. In step 160, the preferred embodiment of the stepping rate control logic 100 for a solar wing 24, 26 driven by a stepper-motor is implemented using an analog "integrate and dump" circuit which limits the commanded wing slew rate $\omega^{cmd}$ to a maximum rate. The command stepping rate $\omega^{cmd}$ is integrated to derive an angular error command. When the angular error command exceeds a preselected threshold value, typically equal to or slightly greater than one solar wing drive step, a pulse control signal command is output to step the solar wing drive 52, 54 in step 160. The integrator is then "dumped" by resetting it to zero. In step 162, the solar wing drives 52, 54 apply torque to rotate solar wings 24, 26, respectively. This rotational force becomes part of the spacecraft dynamics in step 162 and affects the angle of solar wings 24, 26 with respect to the sun. In step 166, front sun sensors 32, 34 and 36, 38 on north and south solar wings 24, 26, respectively, detect any change in the angle of the solar wings 24, 26 with respect to the sun as proportional to the first and second front sensor difference signal 114 (second front sensor 32, 36 minus the first front sensor 34, 38, respectively) enabling safe-hold processor 64 to compute a measured wing azimuth angle with respect to the sun $\theta^m$. In step 168, the measured wing azimuth angle with respect to the sun $\theta^m$ is subtracted from the commanded wing angle with respect to the sun $\theta^{cmd}$ (nominally 0 degrees) and again is multiplied by gain factor K.

While the preferred implementation for the safe-hold control system 62 is described above, several alternative implementations are possible and are listed below:

(a) Controlling the pointing or attitude of the entire momentum-biased spacecraft 20 by applying torque to the momentum wheel 48, 50 rather than actively controlling the solar wings 24, 26. This implementation has the advantage of simplicity and needing only one set of safe-hold sun sensors 28, 32, 34 and 30, 36, 38, although one set on each solar wing 24, 26 is still preferable to detect solar wing drive 52, 54 failures. The major disadvantage of this implementation is that the entire spacecraft 20 must be rotated or steered by the momentum wheel 48, 50 which typically has very limited torque capability, resulting in very slow acquisition of a sun pointing attitude (½ hour or so).

(b) Control the momentum wheel 48, 50 to a fixed speed, for example, the speed the momentum wheel 48, 50 had before the attitude control system 42 failure, instead of commanding full torque. This implementation is necessary, for example, if the momentum wheel 48, 50 does not have internal circuitry to limit its speed. This implementation is also necessary if only certain values of wheel speed are acceptable to ensure nutational stability. One disadvantage of this implementation is additional complexity in the safe-hold processor 64 to process tachometer signals.

(c) Not controlling the momentum wheel 48, 50 at all but letting both momentum wheels 48, 50 spin down. As the momentum wheel 48, 50 begins to spin down, its momentum is absorbed into the spacecraft body 22, which begins to rotate. The disadvantage of this implementation is that the stored in the momentum wheel 48, 50, i.e., the momentum wheel 48, 50 must be spinning in many spacecraft designs to ensure nutational stability.

The foregoing detailed description shows that the preferred embodiment of the present invention is well-suited to fulfill the objects of the invention. It is recognized that those skilled in the art may make various modifications or additions to the preferred embodiment without departing from the spirit of the invention. Accordingly, it is to be understood that the invention should be deemed to extend to all fair equivalents thereof.

What is claimed is:

1. A method for stabilizing a spacecraft having at least one solar cell and at least one momentum wheel comprising the steps of:
   (A) detecting an error in the attitude of said spacecraft;
   (B) disabling an automatic attitude control which normally controls the attitude of said spacecraft;
   (C) shifting said spacecraft into a safe-hold control attitude by steering said spacecraft about its pitch axis into an attitude in which the sun is maintained incident on said solar cell.

2. The method of claim 1, wherein step (C) further comprises the steps of:
   closing thruster latch valves and powering off thruster valve drivers in said spacecraft;
   controlling telemetry and command units of said spacecraft to achieve the maximum global coverage; and
   configuring payload and heaters of said spacecraft to minimize spacecraft power requirements while maintaining spacecraft temperatures above survival lower limits.

3. The method of claim 1 wherein step (C) further comprises the steps of:
   accelerating said momentum wheel to full speed; and
   rotating said one solar cell into incident sunlight.

4. The method of claim 3, wherein said one solar cell is mounted on a solar wing on said spacecraft, and said rotating of said one solar cell is performed by rotating said solar wing.

5. The method of claim 4, wherein rotating said solar wing further comprises the steps of:
   rotating said solar wing at a high rate if the sun is detected by said solar cell on the back side of said solar wing, whereby the front side of said solar wing is steered into incident sunlight;
   rotating said solar wing at a high rate in the direction necessary to center said incident sunlight on said solar wing if the direction of said sun is detected by said cell to be outside a preselected range; and
   rotating said solar wing at a rate dependent on a sensed pointing error if said sun is within a predetermined range whereby said solar wing is controlled by closed loop action.

6. The method of claim 1, wherein step (C) further comprises the step of applying torque to said momentum wheel to control the pointing of said spacecraft body such that light is maintained incident on said solar cell.

7. The method of claim 1, wherein step (C) further comprises the step of controlling said momentum wheel to a predetermined fixed rate of rotation such that nutational stability of said spacecraft is achieved.

8. The method of claim 7 wherein said momentum wheel is a voltage drive wheel controlled to said predetermined rate by setting its drive voltage to balance the back electromotive force and friction of said drive wheel at said predetermined rate.

9. The method of claim 7, wherein said predetermined rate is the rate of rotation of said momentum wheel immediately before the detection of said error.

10. The method of claim 1, wherein said solar wing is fixed relative to the body of said spacecraft and step (C) further comprises the step of selecting one of a plurality of said momentum wheels which was not being used prior the detection of said error to steer said spacecraft to track the sun.

11. The method of claim 1, wherein step (C) further comprises the step of allowing all of a plurality of said momentum wheels to spin down whereby momentum stored in said momentum wheels is transferred to the body of said spacecraft causing said body to begin to rotate.

12. A control system for achieving a safe attitude and passively stable nutational state for a spacecraft having a body and at least one solar wing on said body, comprising:
   a gyro for detecting rotation rates of said spacecraft and for providing a signal indicating an attitude control system error;
   a solar wing drive, coupled with said solar wing, for rotating said solar wing relative to the body of said spacecraft;
   a sensor for detecting attitude errors in said spacecraft and for providing a pointing signal for controlling said drive;
   a momentum generator coupled with said spacecraft body for applying angular momentum to said body to place said spacecraft in a passively stable nutational state; and
   a control processor responsive to said attitude control system error signal and said pointing signal for controlling said drive to rotate said solar wing in a manner to cause said spacecraft to track said sun.

13. The control system of claim 12, wherein said drive includes a stepper-driven motor, and there is further provided a control circuit, said control circuit including:
   a controller for providing a control signal to said stepper-driven motor when said attitude error exceeds a predetermined value, and
   an integrator for integrating said control signal to derive a command signal for said stepper-driven motor, said integrator being resettable to zero when said command signal exceeds a predetermined threshold value and a motor step is commanded.

14. The control system of claim 12, wherein said momentum generator comprises a momentum wheel drive having an overspeed protector for limiting the rotation speed of the momentum wheel to a fixed value.

15. The control system of claim 12, wherein said momentum generator includes means for producing tachometer signals and said control processor processes said tachometer signals.

16. A control system for achieving a safe attitude and passively stable nutational state for a spacecraft having a body and at least one solar wing on said body, comprising:
   a solar wing drive, coupled to said solar wing, for rotating said solar wing relative to the body of said spacecraft;
   a sensor for detecting spacecraft attitude errors and for providing a pointing signal for controlling said solar wing drive;

a control processor responsive to said pointing signal for controlling said solar wing drive to rotate said solar wing in a manner to cause said spacecraft to track the sun.

17. A control system for achieving a safe attitude and passively stable nutational state for a spacecraft having a body and at least one fixed solar wing on said body, comprising:

a solar wing drive, coupled to said spacecraft body; and sensing means for detecting spacecraft attitude errors and for providing a pointing signal for controlling said solar wing drive; and a control processor responsive to said attitude control system error signal and said pointing signal for controlling said solar wing drive to rotate said spacecraft body in a manner to cause said solar wing to track the sun.

18. The control system of claim 17, further comprising:

a momentum wheel coupled with said spacecraft body for applying angular momentum to said body to place said spacecraft in a passively stable nutational state.

* * * * *